(12) United States Patent
Schultz et al.

(10) Patent No.: US 11,994,684 B2
(45) Date of Patent: May 28, 2024

(54) IMAGE LIGHT GUIDE WITH ZONED DIFFRACTIVE OPTIC

(71) Applicant: Vuzix Corporation, West Henrietta, NY (US)

(72) Inventors: Robert J. Schultz, Victor, NY (US); Marek W. Kowarz, Henrietta, NY (US); Robert W. Gray, Rochester, NY (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

(21) Appl. No.: 18/009,561

(22) PCT Filed: Jun. 9, 2021

(86) PCT No.: PCT/US2021/036671
§ 371 (c)(1),
(2) Date: Dec. 9, 2022

(87) PCT Pub. No.: WO2021/252672
PCT Pub. Date: Dec. 16, 2021

(65) Prior Publication Data
US 2023/0213770 A1    Jul. 6, 2023

Related U.S. Application Data

(60) Provisional application No. 63/036,758, filed on Jun. 9, 2020.

(51) Int. Cl.
*G02B 27/01* (2006.01)
*G02B 27/42* (2006.01)
*G02B 27/44* (2006.01)

(52) U.S. Cl.
CPC ..... *G02B 27/0172* (2013.01); *G02B 27/4233* (2013.01); *G02B 27/44* (2013.01)

(58) Field of Classification Search
CPC ............ G02B 27/0081; G02B 27/0172; G02B 27/4233; G02B 27/44; G02B 5/1823; G02B 6/00
See application file for complete search history.

(56) References Cited

U.S. PATENT DOCUMENTS 11,586,046 B2 * 2/2023 Waldern ................ G06F 3/0433
2017/0031171 A1   2/2017 Vallius et al.
(Continued)

FOREIGN PATENT DOCUMENTS

DE    102019102606 A1    8/2020
JP    2022506593 A       1/2022
(Continued)

OTHER PUBLICATIONS

International Search Report and Written Opinion dated Sep. 15, 2021 in International Patent Application No. PCT/US2021/036671, 10 pages.

*Primary Examiner* — Nelson M Rosario
(74) *Attorney, Agent, or Firm* — Harter Secrest & Emery LLP; Jacob D. Merrill, Esq.

(57) ABSTRACT

An image light guide for conveying a virtual image, including a waveguide, an in-coupling diffractive optic operable to direct image-bearing light beams into the waveguide, and an out-coupling diffractive optic operable to direct the image-bearing light beams from the waveguide toward an eyebox. The out-coupling diffractive optic having two or more zones each including a set of diffractive features, wherein successive zones along one dimension of the out-coupling diffractive optic have different respective sets of diffractive features, wherein the diffractive features are operable to direct image-bearing light beams of a first pixel incident upon the diffractive features at a first angle whereby the directed image-bearing light beams of the first pixel further propagate within the waveguide, and wherein the diffractive
(Continued)

features are operable to out-couple a portion of the image-bearing light beams of the first pixel incident upon the diffractive features at a second angle.

19 Claims, 16 Drawing Sheets

(56) References Cited

U.S. PATENT DOCUMENTS

| | | |
|---|---|---|
| 2020/0144109 A1 | 5/2020 | Thijssen et al. |
| 2020/0159023 A1 | 5/2020 | Bhargava et al. |
| 2020/0174255 A1 | 6/2020 | Hollands et al. |

FOREIGN PATENT DOCUMENTS

| | | |
|---|---|---|
| JP | 2022509083 A | 1/2022 |
| JP | 2022519350 A | 3/2022 |
| JP | 2022528594 A | 6/2022 |
| WO | 2018213009 A1 | 11/2018 |
| WO | 2018220266 A1 | 12/2018 |
| WO | 2018231754 A1 | 12/2018 |
| WO | 2020096754 A1 | 5/2020 |
| WO | 2020106824 A1 | 5/2020 |
| WO | 2020212647 A1 | 10/2020 |

\* cited by examiner

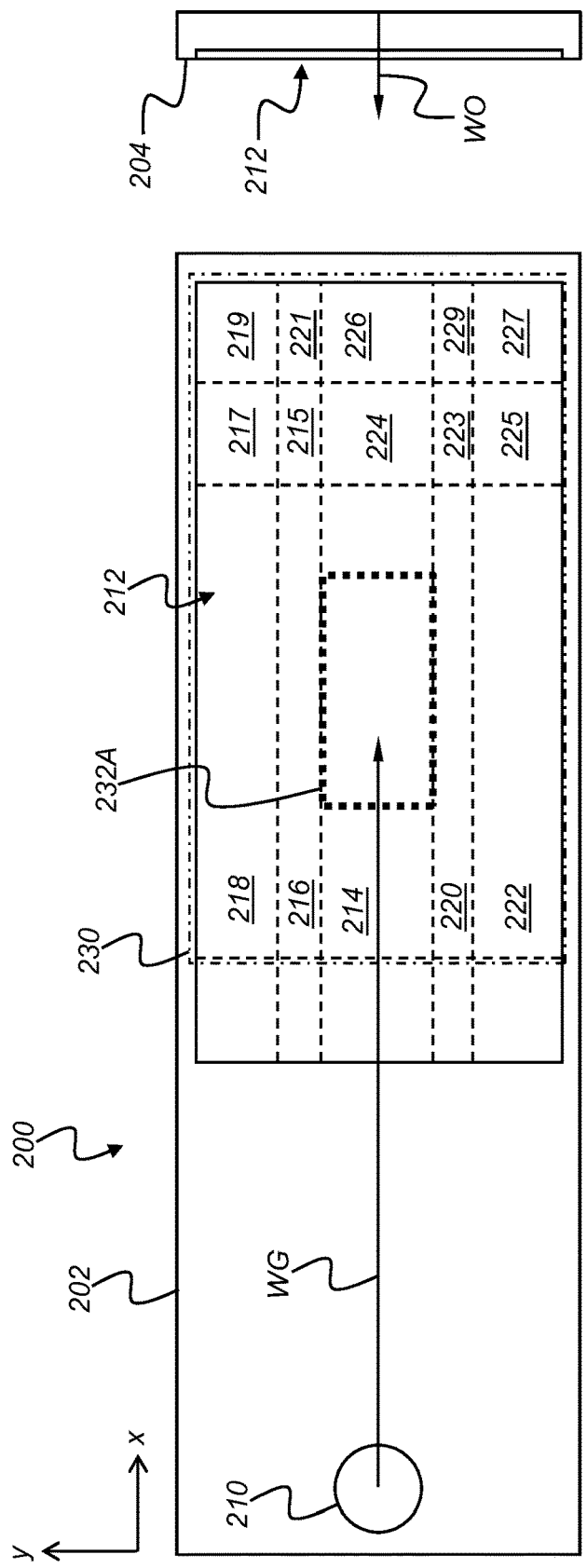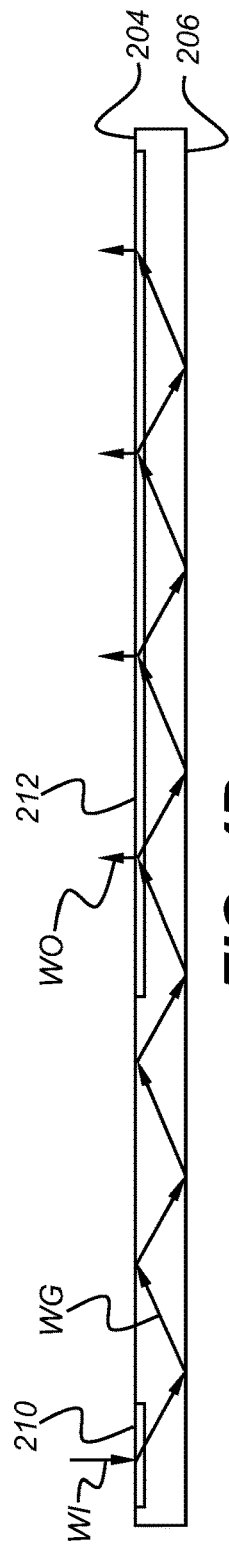
FIG. 4A
FIG. 4B
FIG. 4C

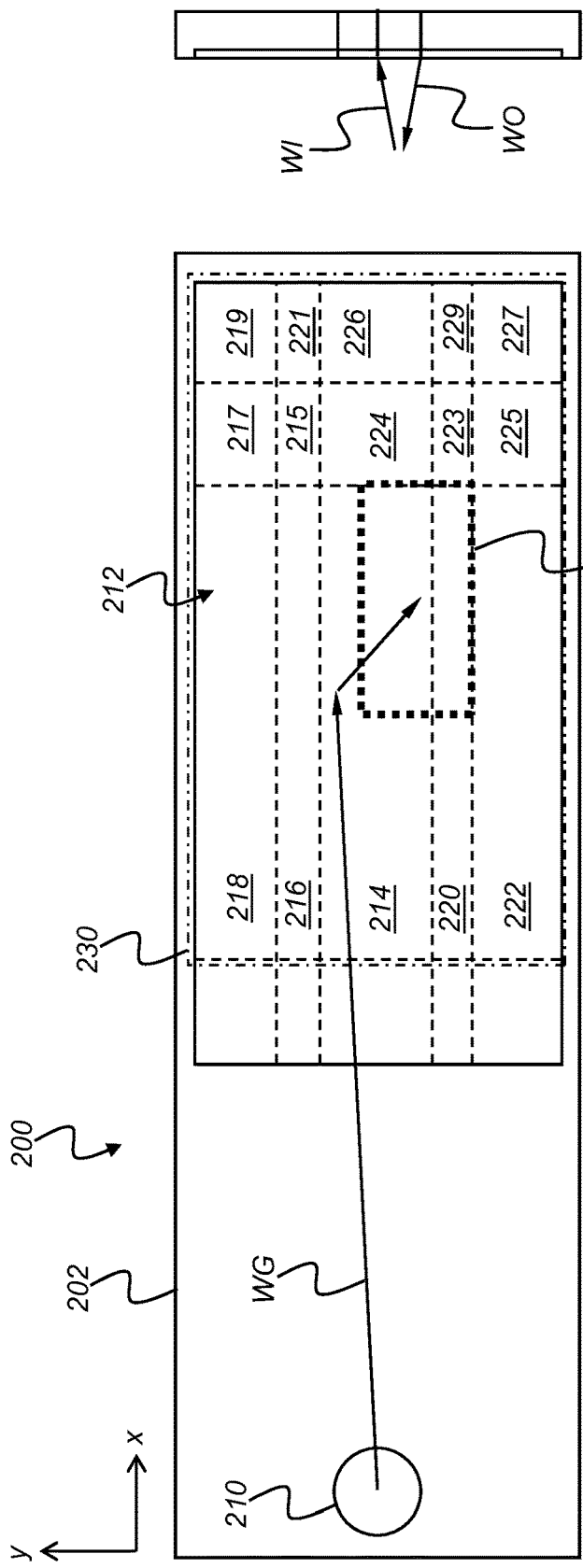
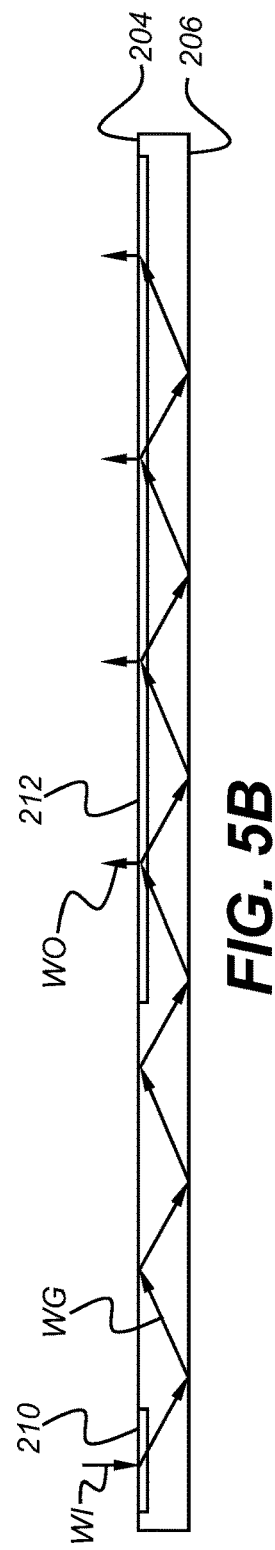
FIG. 5A
FIG. 5B
FIG. 5C

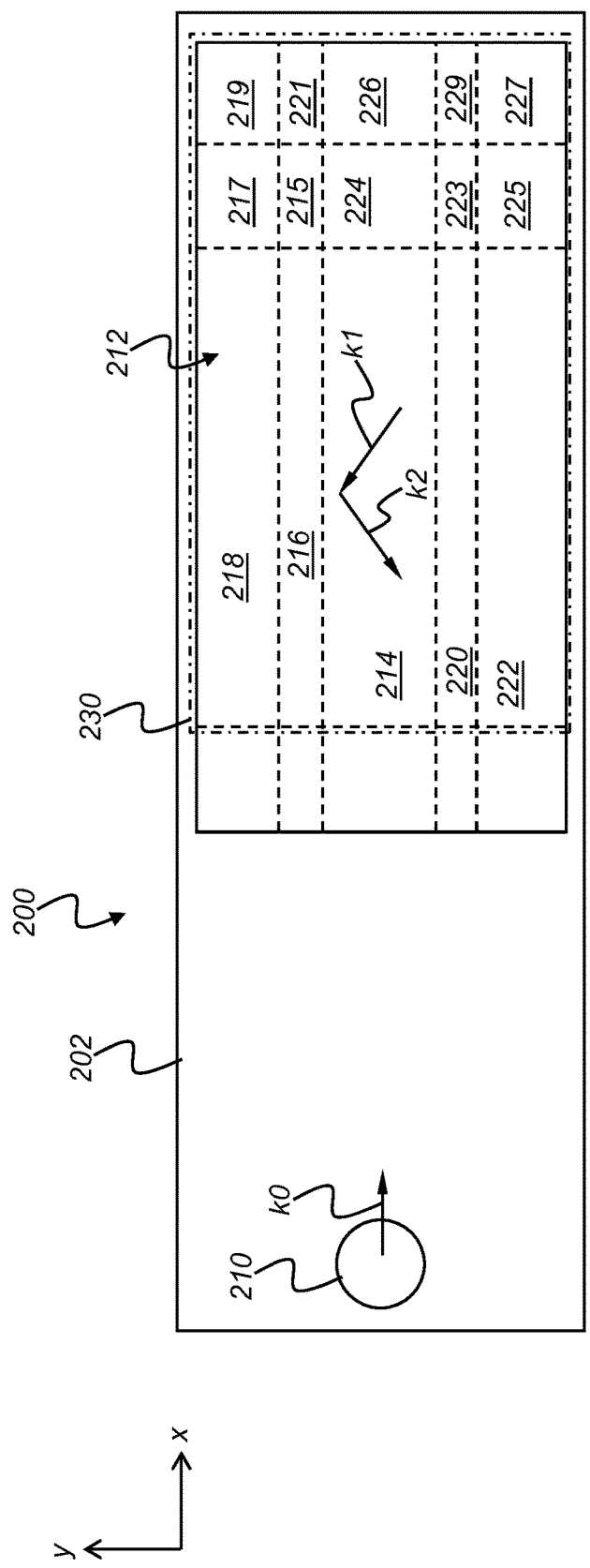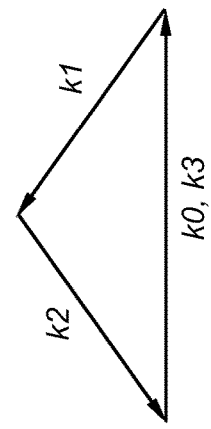
FIG. 6A
FIG. 6B

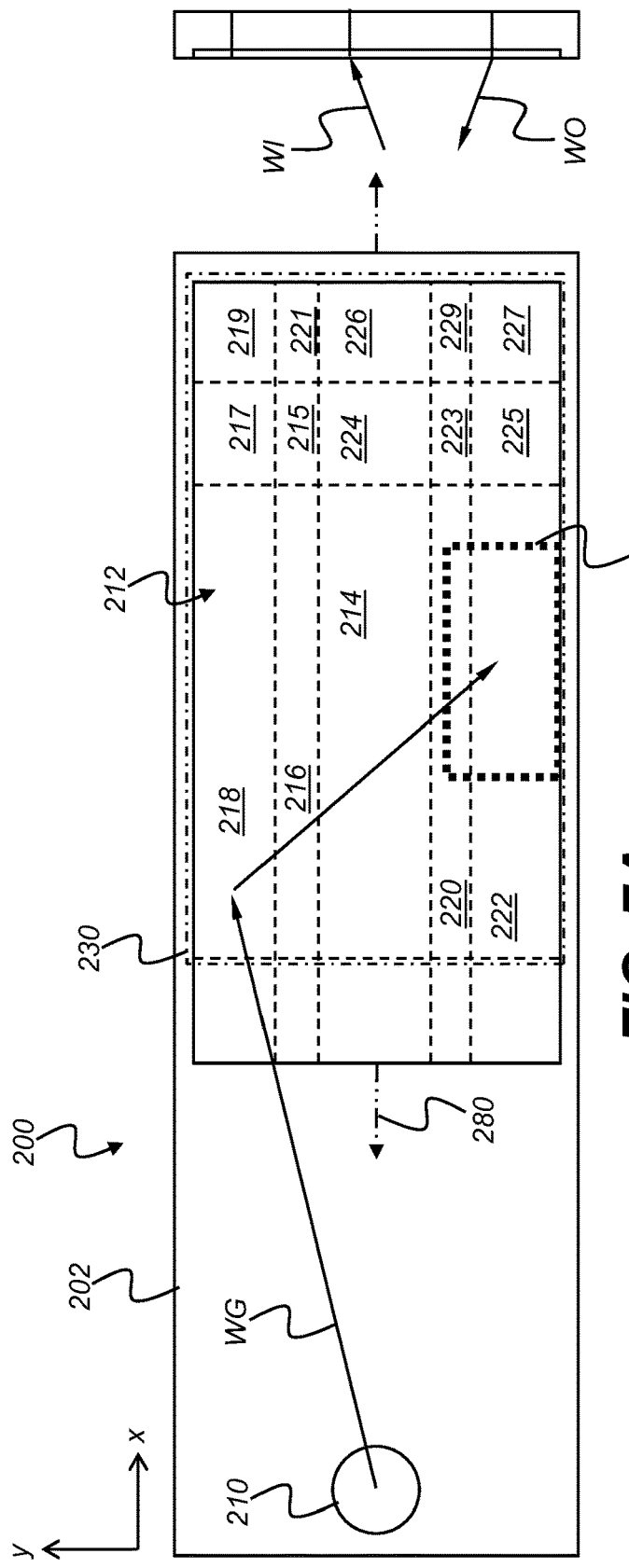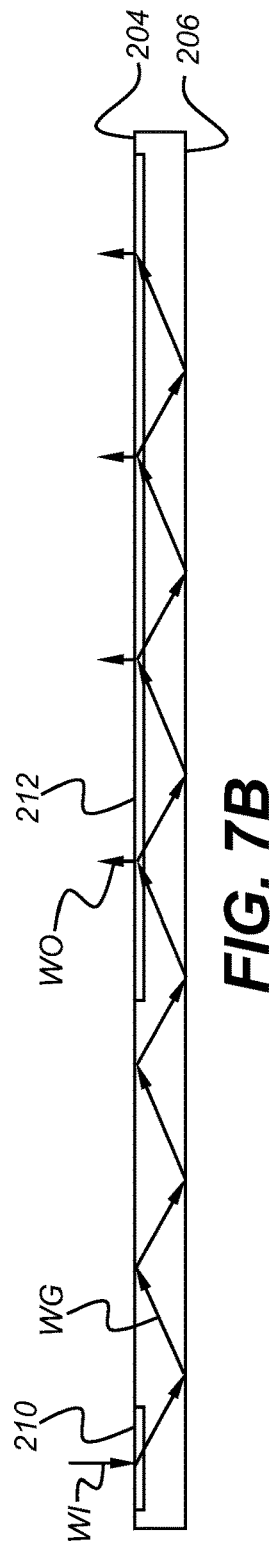

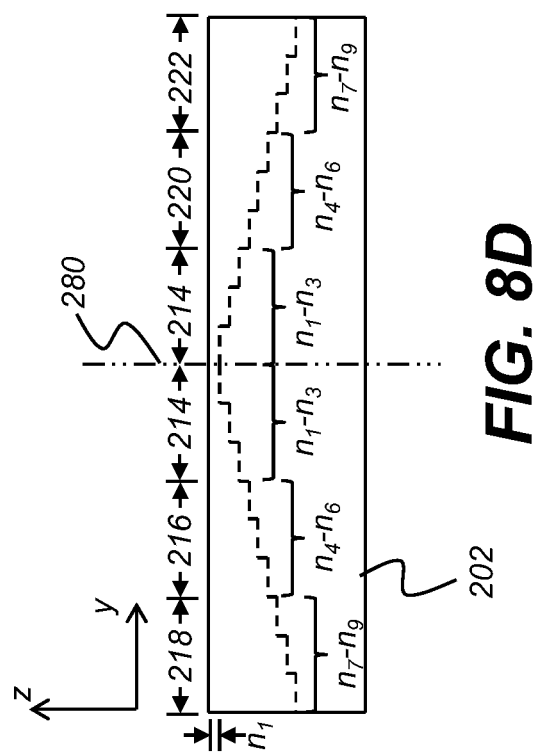
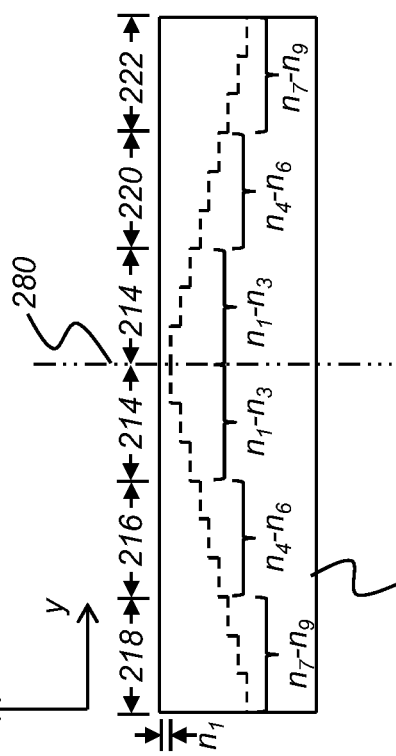
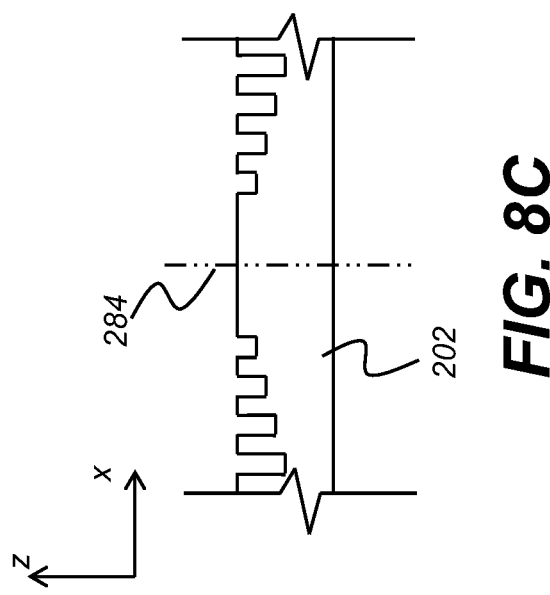

IMAGE LIGHT GUIDE WITH ZONED DIFFRACTIVE OPTIC

TECHNICAL FIELD

The present disclosure relates generally to electronic displays and more particularly to displays utilizing an image light guide having diffractive optics.

BACKGROUND

Head-Mounted Displays (HMDs) and virtual image near-eye displays are being developed for a range of diverse uses, including military, commercial, industrial, fire-fighting, and entertainment applications. For many of these applications, there is value in forming a virtual image that can be visually superimposed over the real-world image that lies in the field of view of the HMD user. An optical image light guide may convey image-bearing light to a viewer in a narrow space for directing the virtual image to the viewer's pupil and enabling this superposition function.

In conventional image light guides, collimated, relatively angularly encoded light beams from an image source are coupled into a planar waveguide by an input coupling such as an in-coupling diffractive optic, which can be mounted or formed on a surface of the planar waveguide or buried within the waveguide. After propagating along the waveguide, the diffracted light can be directed back out of the waveguide by an out-coupling diffractive optic, which can be arranged to provide pupil expansion along one dimension of the virtual image. In addition, a turning optic can be positioned along the waveguide between the in-coupling and out-coupling diffractive optics to provide pupil expansion in an orthogonal dimension of the virtual image. The image-bearing light output from the waveguide provides an expanded eyebox for the viewer.

It can be appreciated that there would be advantages to a display apparatus having improved diffraction efficiency, image-bearing light output intensity, and uniformity across the entire output aperture.

SUMMARY

It is an object of the present disclosure to advance the art of virtual image presentation particularly when using compact head-mounted devices and similar imaging apparatus. According to an aspect of the present disclosure, in a first exemplary embodiment, there is provided an image light guide for conveying a virtual image, including a waveguide, an in-coupling diffractive optic operable to direct image-bearing light beams into the waveguide, and an out-coupling diffractive optic operable to direct the image-bearing light beams from the waveguide toward an eyebox. The out-coupling diffractive optic including two or more zones each comprising a set of diffractive features, wherein successive zones along one dimension of the out-coupling diffractive optic have different respective sets of diffractive features, wherein the diffractive features are operable to direct a portion of image-bearing light beams of a first pixel incident upon the diffractive features at a first angle whereby the directed image-bearing light of said first pixel further propagates within the waveguide, and wherein the diffractive features are operable to out-couple a portion of image-bearing light beams of said first pixel incident upon the diffractive features at a second angle, wherein the out-coupled portion of the image-bearing light beams corresponding to the first pixel is outcoupled at the same angle in the successive zones.

In a second exemplary embodiment, there is provided an image light guide for conveying a virtual image including a waveguide, an in-coupling diffractive optic operable to direct image-bearing light beams into the waveguide and an out-coupling diffractive optic operable to direct the image-bearing light beams from the waveguide toward an eyebox. The out-coupling diffractive optic including two or more zones each comprising a set of diffractive features, wherein each set of diffractive features within each two or more zones comprises a plurality of unit cells arranged in a two-dimensional periodic lattice. The two-dimensional periodic lattice is the same for each two or more zones within the out-coupling diffractive optic, and the unit cells between at least two adjacent zones define different diffractive features.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

FIGS. 4A, 4B, and 4C are top, side, and end views, respectively, of an image light guide having a zoned out-coupling diffractive optic according to an exemplary embodiment of the presently disclosed subject matter.

FIGS. 5A, 5B, 5C are top, side, and end views, respectively, of the image light guide having a zoned out-coupling diffractive optic according to FIG. 4A.

FIGS. 6A, 6B show grating vector diagrams according to an exemplary embodiment of the presently disclosed subject matter.

FIGS. 7A, 7B, 7C are top, side, and end views, respectively, of the image light guide having a zoned out-coupling diffractive optic according to FIG. 4A.

FIGS. 8A, 8B, 8C, 8D are schematics showing progressive diffractive feature depth according to exemplary embodiments of the presently disclosed subject matter.

DETAILED DESCRIPTION

Figure 1:
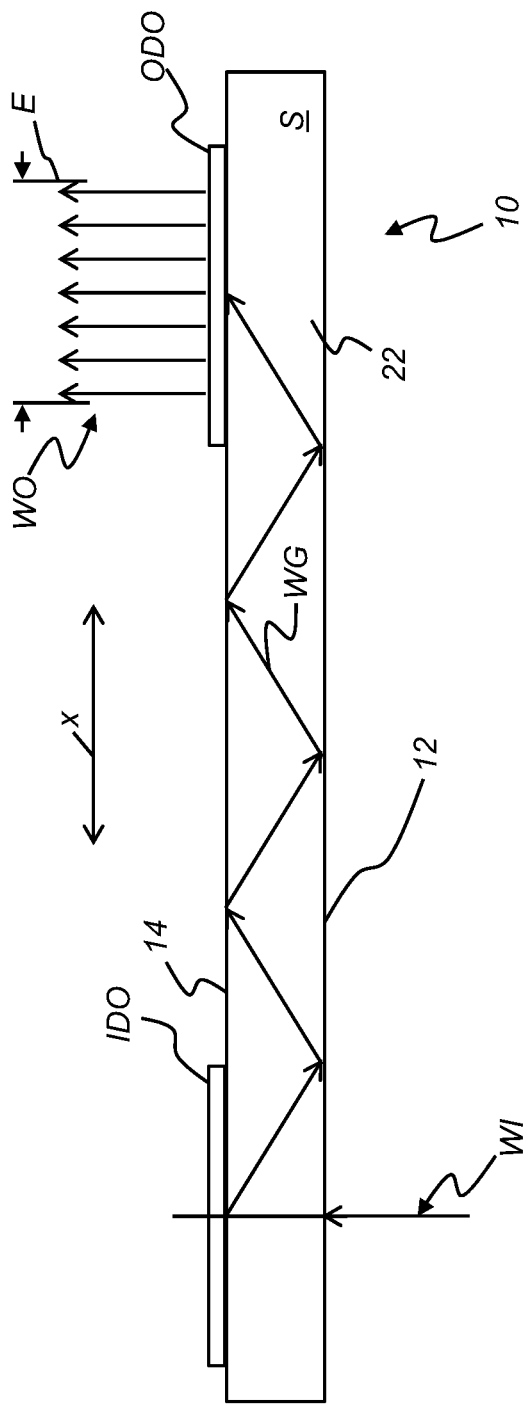
FIG. 1 is a schematic diagram showing a simplified cross-sectional view of an image light guide for conveying a virtual image with an out-coupling diffractive optic providing pupil expansion along one dimension of the virtual image.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Where they are used herein, the terms "first", "second", and so on, do not necessarily denote any ordinal, sequential, or priority relation, but are simply used to more clearly distinguish one element or set of elements from another, unless specified otherwise.

Where used herein, the term "exemplary" is meant to indicate "an example of", and is not intended to suggest any preferred or ideal embodiment.

Where they are used herein, the terms "viewer", "operator", "observer", and "user" are considered to be equivalent and refer to the person who views virtual images conveyed by one of the considered image light guides, especially as arranged in an HMD viewing device.

Where used herein, the term "energizable" relates to a device or set of components that perform an indicated function upon receiving power and, optionally, upon receiving an enabling signal.

Where used herein, the term "set" refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

Where they are used herein, the phrases "optical infinity" and "at infinity" correspond to conventional usage in the camera and imaging arts, indicating image formation using one or more bundles of substantially collimated light, so that the focus distance exceeds at least about 4 meters.

Where they are used herein, the terms "coupled" or "coupler" in the context of optics refer to a connection by which light travels from one optical medium or device to another optical medium or device through an intermediate structure that facilitates the connection.

Where they are used herein, the terms "beam expander" and "pupil expander" are considered synonymous and are used interchangeably herein. These terms are used generally herein to refer to enlarging the area of overlap among angularly related beams for conveying virtual images.

As an alternative to real image projection, an optical system can produce a virtual image that is apparent to the eye of a viewer. In contrast to methods for forming a real image, a virtual image is not formed on a display surface. That is, if a display surface were positioned at the perceived location of a virtual image, no image would be formed on that surface. Virtual image display has a number of inherent advantages for augmented reality presentation. For example, the apparent size of a virtual image is not limited by the size or location of a display surface. Additionally, the source object for a virtual image may be small; a magnifying glass, as a simple example, provides a virtual image of its object. In comparison with systems that project a real image, a more realistic viewing experience can be provided by forming a virtual image that appears to be some distance away. Providing a virtual image also obviates the need to compensate for screen artifacts, as may be necessary when projecting a real image.

FIG. 1 is a schematic diagram showing a simplified cross-sectional view of one conventional configuration of a monocular type image light guide 10 comprising a planar waveguide 22 having plane-parallel surfaces 12, 14. The waveguide 22 comprises a transparent substrate S. An in-coupling diffractive optic IDO and an out-coupling diffractive optic ODO are arranged on the planar waveguide 22. In this example, the in-coupling diffractive optic IDO is shown as a reflective type diffraction grating arranged on an inner surface 14 of the planar waveguide 22 opposite to the outer surface 12 of the planar waveguide 22 through which incoming image-bearing light WI approaches the planar waveguide 22. However, in-coupling diffractive optic IDO could alternately be a transmissive diffraction grating, volume hologram or other holographic diffraction element, or other type of optical component that provides diffraction for the incoming, image-bearing light WI. The in-coupling diffractive optic IDO can be located on the outer surface 12 or inner surface 14 of the planar waveguide 22 and can be of a transmissive or reflective type in a combination that depends upon the direction from which the incoming image-bearing light WI approaches the planar waveguide 22.

When used as a part of a virtual display system, in-coupling diffractive optic IDO couples the incoming image-bearing light WI from a real, virtual or hybrid image source into the substrate S of the planar waveguide 22. Any real image or image dimension is first converted, into an array of overlapping angularly related beams encoding the different positions within the image similar to a virtual image for presentation to the in-coupling diffractive optic IDO. The incoming image-bearing light WI is diffracted (generally through a first diffraction order) and thereby redirected by in-coupling diffractive optic IDO into the planar waveguide 22 as image-bearing light WG for further propagation along the planar waveguide 22 by Total Internal Reflection (TIR). Although diffracted into a generally more condensed range of angularly related beams in keeping with the boundaries set by TIR, the image-bearing light WG preserves the image information in an encoded form. The out-coupling diffractive optic ODO receives the encoded image-bearing light WG and diffracts a portion of the image-bearing light WG out of the planar waveguide 22 as the image-bearing light WO toward the intended location of a viewer's eye. Generally, the out-coupling diffractive optic ODO is designed symmetrically with respect to the in-coupling diffractive optic IDO to restore the original angular relationships of the image-bearing light WI among outputted angularly related beams of the image-bearing light WO. However, to increase one dimension of overlap among the angularly related beams in a so-called eyebox E within which the virtual image can be seen, the out-coupling diffractive optic ODO is arranged to encounter the image-bearing light WG multiple times and to diffract only a portion of the image-bearing light WG on each encounter. The multiple encounters along the length of the out-coupling diffractive optic ODO have the effect of enlarging at least one dimension of each of the angularly related beams of the image-bearing light WO thereby expanding one dimension of the eyebox E within which the beams overlap. The expanded eyebox E decreases sensitivity to the position of a viewer's eye for viewing the virtual image.

Out-coupling diffractive optics with refractive index variations along a single dimension can expand one dimension of the eyebox by expanding the individual angularly related beams in their direction of propagation along the waveguide between encounters with the out-coupling diffractive optic. In addition, out-coupling diffractive optics with refractive index variations along a second dimension can expand a second dimension of the eyebox and provide two-dimensional expansion of the eyebox. The refractive index variations along a first dimension of the out-coupling diffractive optic can be arranged to diffract a portion of each beam's energy out of the waveguide upon each encounter therewith through a desired first order of diffraction, while another portion of the beam's energy is preserved for further propagation in its original direction through a zero order of diffraction. The refractive index variations along a second dimension of the out-coupling diffractive optic can be arranged to diffract a portion of each beam's energy upon each encounter therewith through a desired first order of diffraction in a direction angled relative to the beam's original direction of propagation, while another portion of the beam's energy is preserved for further propagation in its original direction through a zero order of diffraction.

The out-coupling diffractive optic ODO is shown as a transmissive type diffraction grating arranged on the inner surface 14 of the planar waveguide 22. However, similar to the in-coupling diffractive optic IDO, the out-coupling diffractive optic ODO can be located on the outer surface 12 or the inner surface 14 of the planar waveguide 22 and be of a transmissive or reflective type in a combination that depends upon the direction through which the image-bearing light WG is intended to exit the planar waveguide 22.

Figure 2:
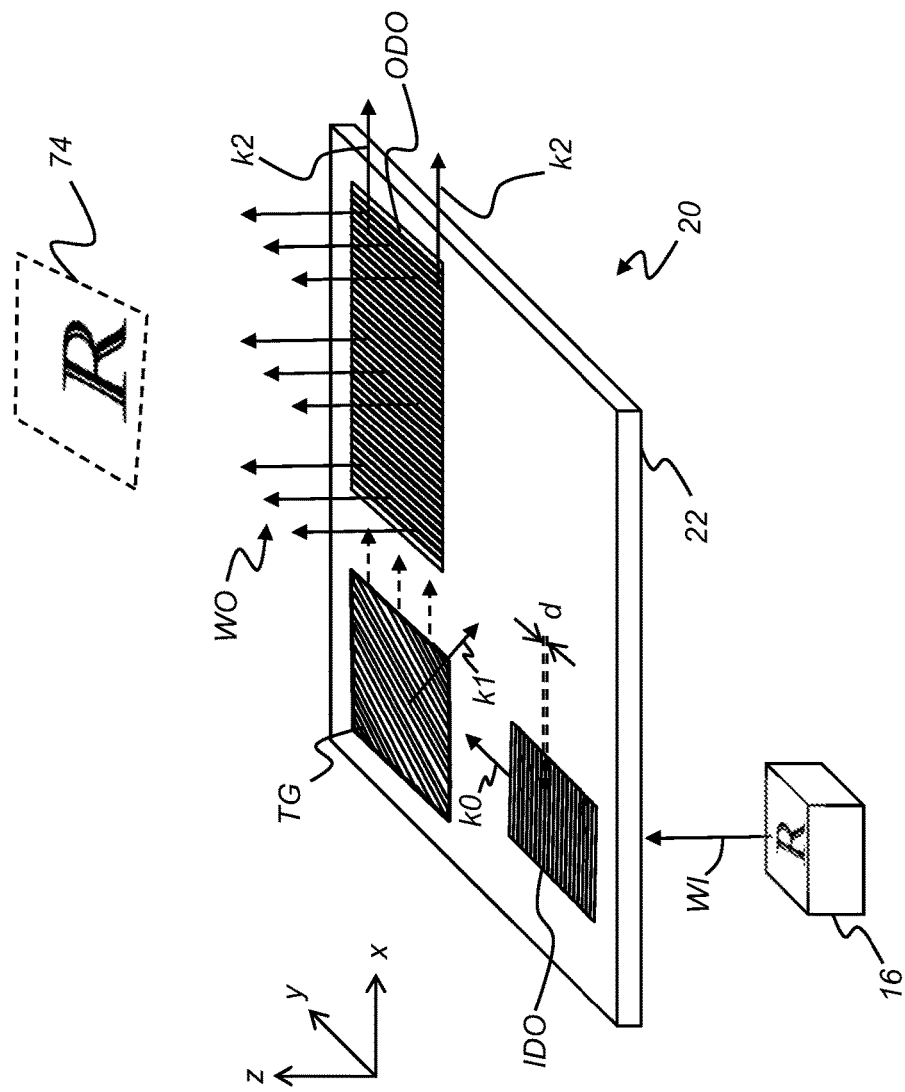
FIG. 2 is a schematic diagram showing a perspective view of an image light guide for conveying a virtual image with a turning grating in addition to an out-coupling diffractive optic providing pupil expansion along two dimensions of the virtual image.

The perspective view of FIG. 2 shows an image light guide 20 that is arranged for expanding the eyebox 74 in two dimensions, i.e., along both x- and y-axes of the intended image. To achieve a second dimension of beam expansion, the in-coupling diffractive optic IDO is oriented to diffract the image-bearing light WG about a grating vector k0 toward an intermediate turning optic TG, whose grating vector k1 is oriented to diffract the image-bearing light WG in a reflective mode toward the out-coupling diffractive optic ODO. Only a portion of the image-bearing light WG is diffracted by each of multiple encounters with intermediate turning optic TG thereby laterally expanding each of the angularly related beams of the image-bearing light WG approaching the out-coupling diffractive optic ODO. The turning optic TG redirects a portion of the image-bearing light WG toward the out-coupling diffractive optic ODO for longitudinally expanding the angularly related beams of the image-bearing light WG in a second dimension before exiting the planar waveguide 22 as the image-bearing light WO. Grating vectors, such as the depicted grating vectors k0, k1, and k2, extend in a direction that is normal to the diffractive features (e.g., grooves, lines, or rulings) of the diffractive optics and have a magnitude inverse to the period or pitch d (i.e., the on-center distance between grooves) of the diffractive optics IDO, TG, and ODO.

In the image light guide 20 of FIG. 2, in-coupling diffractive optic IDO receives the incoming image-bearing light WI containing a set of angularly related beams corresponding to individual pixels or equivalent locations within an image generated by an image source 16. A full range of angularly encoded beams for producing a virtual image can be generated by a real display together with focusing optics, by a beam scanner for more directly setting the angles of the beams, or by a combination such as a one-dimensional real display used with a scanner. The image light guide 20 outputs an expanded set of angularly related beams in two dimensions of the image by providing multiple encounters of the image-bearing light WG with both the intermediate turning optic TG and the out-coupling diffractive optic ODO in different orientations. In the given orientation of the planar waveguide 22, the intermediate turning optic TG provides beam expansion in the y-axis direction, and the out-coupling diffractive optic ODO provides a similar beam expansion in the x-axis direction. The reflectivity characteristics and respective periods d of the two diffractive optics IDO and ODO and the intermediate turning optic TG, together with the orientations of their respective grating vectors, provide for beam expansion in two dimensions while preserving the intended relationships among the angularly related beams of the image-bearing light WI that are output from the image light guide 20 as the image-bearing light WO.

That is, while the image-bearing light WI input into the image light guide 20 is encoded into a different set of angularly related beams by the in-coupling diffractive optic IDO, the information required to reconstruct the image is preserved by accounting for the systematic effects of the in-coupling diffractive optic IDO. The turning grating TG, located in an intermediate position between the in-coupling and out-coupling diffractive optics IDO and ODO, is typically arranged so that it does not induce any significant change on the encoding of the image-bearing light WG. The out-coupling diffractive optic ODO is typically arranged in a symmetric fashion with respect to the in-coupling diffractive optic IDO, e.g., including diffractive features sharing the same period. Similarly, the period of the turning grating TG also typically matches the common period of the in-coupling and out-coupling diffractive optics IDO and ODO. Although the grating vector k1 of the turning optic TG is shown oriented at 45 degrees with respect to the other grating vectors, which remains a possible orientation, the grating vector k1 of the turning grating TG may be oriented at 60 degrees to the grating vectors k0 and k2 of the in-coupling and out-coupling diffractive optics IDO and ODO in such a way that the image-bearing light WG is turned 120 degrees. By orienting the grating vector k1 of the intermediate turning grating at 60 degrees with respect to the grating vectors k0 and k2 of both the in-coupling and out-coupling diffractive optics IDO and ODO, the grating vectors k0 and k2 of the in-coupling and out-coupling diffractive optics IDO and ODO are also oriented at 60 degrees with respect to each other. Basing the grating vector magnitudes on the common pitch of the turning grating TG and the in-coupling and out-coupling diffractive optics IDO and ODO, the three grating vectors k0, k1, and k2 form an equilateral triangle, and sum to a zero magnitude, which avoids asymmetric effects that could introduce unwanted aberrations including chromatic dispersion.

The image-bearing light WI that is diffracted into the planar waveguide 22 is effectively encoded by the in-coupling optic, whether the in-coupling optic uses gratings, holograms, prisms, mirrors, or some other mechanism. Any reflection, refraction, and/or diffraction of light that takes place at the input must be correspondingly decoded by the output in order to re-form the virtual image that is presented to the viewer. The turning optic TG, placed at an optically intermediate position between the in-coupling and out-coupling diffractive optics IDO, ODO, is typically designed and oriented so that it does not induce any change on the encoded light. The out-coupling diffractive optic ODO decodes the image-bearing light WG into its original or desired form of angularly related beams that have been expanded to fill the eyebox 74. In a broader sense, whether any symmetries are maintained or not among the turning optic TG and the in-coupling and out-coupling diffractive optics IDO, ODO or whether or not any change to the encoding of the angularly related beams of the image-bearing light WI takes place along the planar waveguide 22, the turning grating TG and the in-coupling and out-coupling diffractive optics IDO and ODO are related so that the image-bearing light WO that is output from the planar waveguide 22 preserves or otherwise maintains the original or desired form of the image-bearing light WI for producing the intended virtual image.

The letter "R" represents the orientation of the virtual image that is visible to the viewer whose eye is in the eyebox 74. As shown, the orientation of the letter "R" in the represented virtual image matches the orientation of the letter "R" as encoded by the image-bearing light WI. A change in the rotation about the z-axis or angular orientation of incoming image-bearing light WI with respect to the x-y plane causes a corresponding symmetric change in rotation or angular orientation of outgoing light from out-coupling diffractive optic (ODO). From the aspect of image orientation, the turning optic TG acts as a type of optical relay, providing expansion of the angularly encoded beams of the image-bearing light WG along one axis (e.g., along the y-axis) of the image. Out-coupling diffractive optic ODO further expands the angularly encoded beams of the image-bearing light WG along another axis (e.g., along the x-axis) of the image while maintaining the original orientation of the virtual image encoded by the image-bearing light WI. The turning optic TG is typically a slanted or square grating or, alternately, can be a blazed grating and is typically arranged on the front or back surfaces 12, 14 of the planar waveguide 22.

The image light guides 10 and 20 illustrated in FIGS. 1 and 2 can be of a type used in a number of existing HMD designs for providing image content to a viewer. This type of image light guide is particularly well-suited to augmented reality applications in which virtual image content can be superimposed on a real-world view as seen through the transparent planar waveguide 22.

In diffractive optics formed as diffraction gratings, increasing grating depth results in improved diffraction efficiency. However, increased diffraction efficiency in out-coupling diffraction gratings may reduce image-bearing light WO output from outer areas of the diffraction grating because too much image-bearing light WG is output from the center of the out-coupling diffractive optic, creating a visual hotspot. The presently disclosed embodiments of an image light guide utilize a zoned out-coupling diffractive optic to facilitate a more even distribution of out-coupled image-bearing light WO at an increased diffraction efficiency.

Figure 3A:
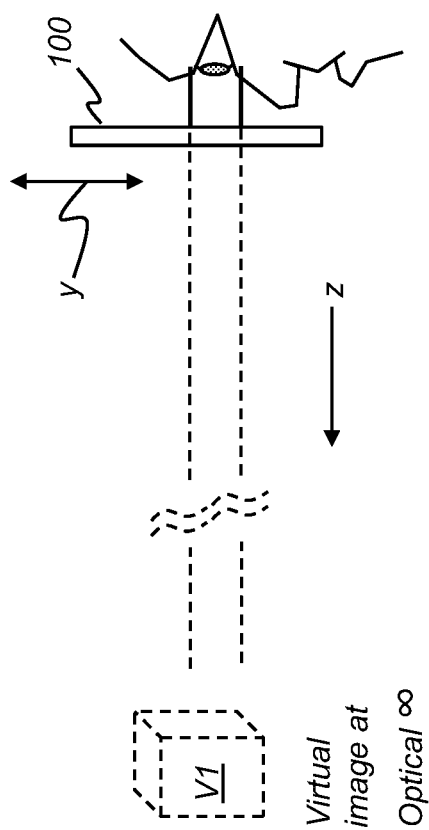
FIGS. 3A, 3B, and 3C are side, top, and perspective views, respectively, of an imaging apparatus with an image light guide for forming a virtual image at infinity focus.
Figure 3B:
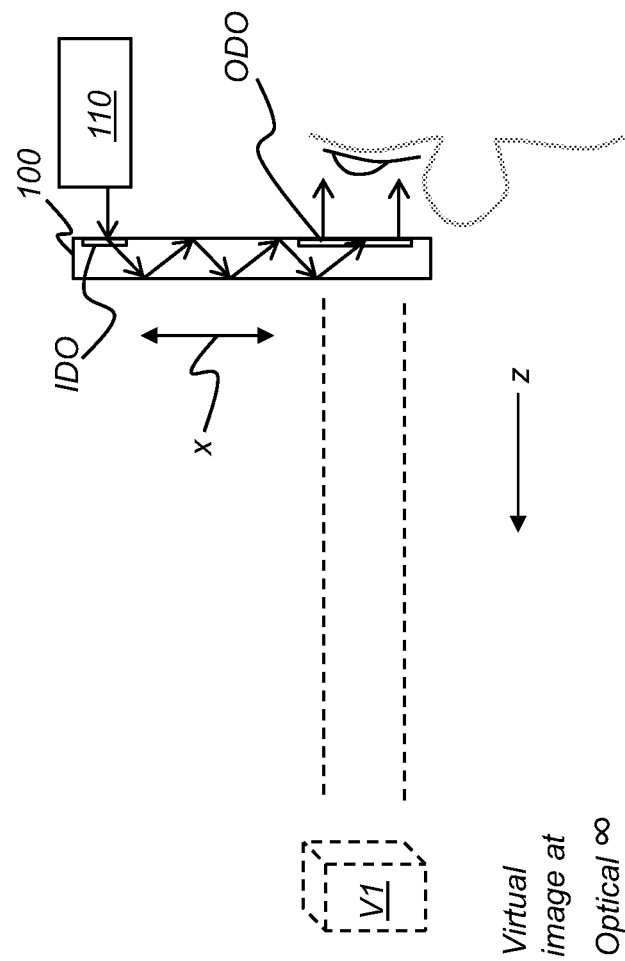
Figure 3C:
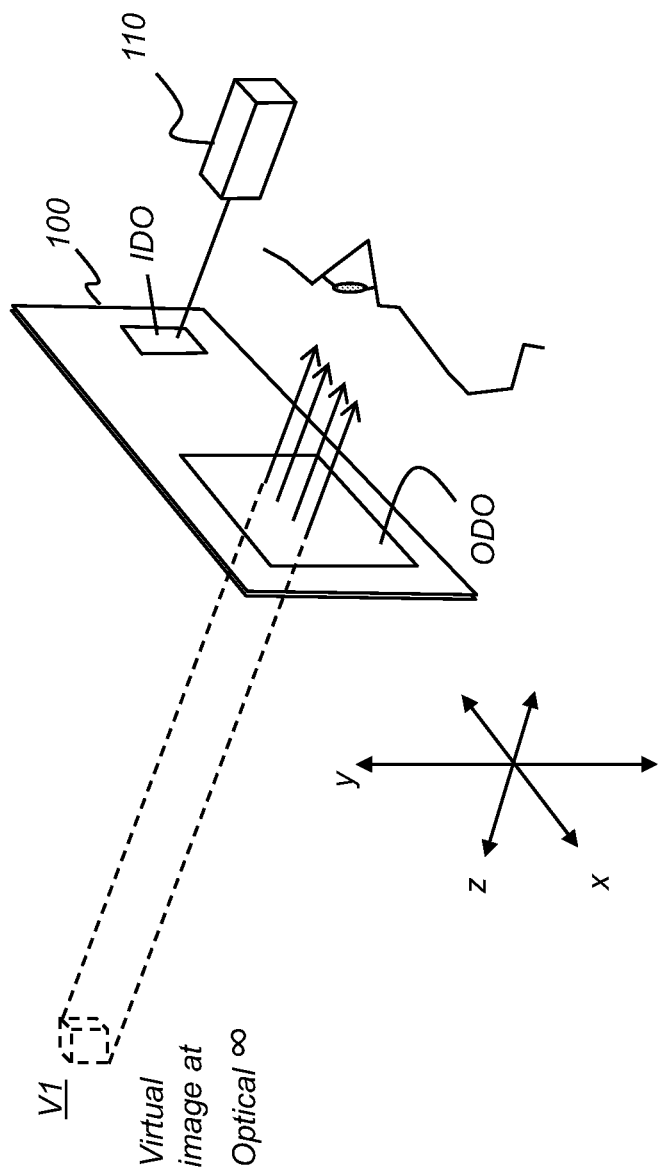

In an embodiment, as illustrated in FIGS. 3A, 3B, and 3C, an image light guide 100 is operable to convey virtual images to expanded eyeboxes and present the virtual images at an optical infinity focus. That is, each of the angularly related beams that comprise the image-bearing light within the eyebox remains in a substantially collimated form. Image content is produced by a projector 110 and conveyed by the image light guide 100 through the in-coupling and out-coupling diffractive optics IDO, ODO appears to a viewer's eye as a virtual image VI located well in front of the image light guide 100 at an infinity focus. The apparent size of the virtual image within the viewer's field of view relates to the ranges of angles through which the angularly related beams encode the image. The solid lines exiting the out-coupling diffractive optic ODO represent one of the collimated beams of the image-bearing light WO, and the dashed lines represent a virtual extension of the one collimated beam in front of the image light guide 100 corresponding to a pixel of the virtual image that appears to emanate from a source located at infinity.

As illustrated in FIGS. 4A-4C, in an embodiment, an image light guide 200 includes a waveguide 202 having front and back parallel surfaces 204, 206. An in-coupling diffractive optic 210 and an out-coupling diffractive optic 212 are located on the waveguide front surface 204. In an embodiment, the in-coupling optic 210 and the out-coupling diffractive optic 212 are located on the waveguide back surface 206. In another embodiment, the in-coupling optic 210 is located on the waveguide front surface 204 and the out-coupling diffractive optic 212 is located on the waveguide back surface 206.

In an embodiment, an intermediate diffractive optic is located optically between the in-coupling diffractive optic 210 and the out-coupling diffractive optic 212. The intermediate diffractive optic may be a turning grating, and/or the intermediate diffractive optic may enable increased design variance.

The out-coupling diffractive optic 212 comprises a compound diffraction grating pattern operable to expand and out-couple image-bearing light WG as image-bearing light WO. A compound diffraction grating pattern includes two or more overlapping diffractive patterns, where each diffractive pattern is demarcated by a grating vector k. In an embodiment, the compound diffraction grating pattern includes a non-overlapping sinusoidal diffractive pattern having three or more vector k components. As illustrated in FIG. 4A, in an embodiment, the out-coupling diffractive optic 212 includes two or more zones 214, 215, 216, 217, 218, 219, 220, 221, 222, 223, 224, 225, 226, 227, 229 of diffractive features, wherein the diffractive features of each zone 214, 215, 216, 217, 218, 219, 220, 221, 222, 223, 224, 225, 226, 227, 229 are different from the diffractive features in an adjacent zone 214, 215, 216, 217, 218, 219, 220, 221, 222, 223, 224, 225, 226, 227, 229. As illustrated in FIGS. 4A-6C, in an embodiment, the out-coupling diffractive optic 212 includes a first zone 214 generally centrally located in the y-axis direction. A second zone 216 is generally located above and adjacent to the first zone 212 in the y-axis direction. A third zone 218 is generally located above and adjacent to the second zone 216. A fourth zone 220 is generally located below and adjacent to the first zone 212 in the y-axis direction. A fifth zone 222 is generally located below and adjacent to the fourth zone 220 in the y-axis direction. A sixth zone 224 is generally centrally located in the y-axis direction and generally located adjacent to the right of the first zone 214 in the x-axis direction. A seventh zone 226 is generally located adjacent to the right of the sixth zone 224 along the x-axis direction.

The out-coupling diffractive optic 212 defines an output aperture 230. Portions of the out-coupling diffractive optic 212 positioned outside of the output aperture 230 sometimes redirect image-bearing light into the output aperture 230 and may be shaped like a wedge or a triangle. The output aperture 230 is shown by a dotted line located outside of the out-coupling diffractive optic 212; however, persons skilled in the art will appreciate that the figures are presented in this way for clarity and that the output aperture 230 does not extend outside of the out-coupling diffractive optic 212.

With continued reference to FIG. 4A, an eyebox 232A (i.e., head motion box) is shown over the first zone 214 of the out-coupling diffractive optic 212 for visualization purposes. The eyebox 232A corresponds to an incoming ray of image-bearing light of the center of the field of view (FOV) for a virtual image. A viewer's eye is positioned at some distance, which may be referred to as eye relief, from the waveguide 202. In operation, the viewer's eye can move within the eyebox 232A and still see the pixel corresponding to the incoming rays.

The in-coupling diffractive optic 210 is operable to in-couple an incoming ray of the image-bearing light WI at a TIR condition whereby the image-bearing light WG propagates towards the out-coupling diffractive optic 212 where the image-bearing light WO can out-couple towards the eyebox 232A. As illustrated in FIG. 4A-4C, in an embodiment, the ray corresponding to the center of the field of view (FOV) for a virtual image is in-coupled into the waveguide 202 via the in-coupling diffractive optic 210. The ray is shown incident on the in-coupling diffractive optic 210 normal to waveguide 202; however, an input central ray may be incident to the in-coupling diffractive optic 210 at an angle other than perpendicular to the waveguide 202. In the embodiment illustrated in FIGS. 4A-4C, the first zone 214 of the out-coupling diffractive optic 212 is operable to expand the image-bearing light WG in one or more dimensions (i.e., x- and y-axis directions) and out-couple the image-bearing light WO in the eyebox 232A.

From the perspective of this field angle, the ideal out-coupling grating in this area under the eyebox 232A would have linear gratings, positioned parallel to the linear gratings of the in-coupling grating, with only one function—to out-couple the image-bearing light WG. However, to facilitate expansion of the image-bearing light to create a larger eyebox, the out-coupling grating of the first zone 214 comprises generally diamond-shaped posts which implicitly define a grating vector k3 parallel with the grating vector k0 of the in-coupling diffractive optic 210. In other words, in the first zone 214 vertical linear grating features are almost completely de-rated such that the only evidence of the vertical linear grating features are the points of the generally diamond-shaped posts. The generally diamond-shaped posts are offset row-to-row, but still make a vertical line. The diffraction of the image-bearing light WO in the eyebox 232A is produced by the periodicity of the diffractive features.

As illustrated in FIGS. 5A-5C, where a ray of image-bearing light WG corresponds to a portion of a virtual image that is down and to the right of center of the virtual image, the projection of the eyebox 232B is correspondingly moved. If the image-bearing light WG was not redirected (i.e., turned) at the out-coupling diffractive optic 212, the out-coupled image-bearing light WO would miss the projection of the eyebox 232B entirely. Here the different zones all outcouple the image-bearing light WO from a single pixel, or field angle, into the same angular range, forming a virtual image. In other words, image-bearing light from a single virtual pixel is output into the same angle by neighboring zones. For example, as illustrated in FIG. 5A, image-bearing light WG for the virtual pixel corresponding to the eyebox 232B is out-coupled at the same angle or angular range in both the first zone 214 and the fourth zone 220.

In an embodiment, the first zone 214 includes diffractive features operable to diffract (i.e., turn) the ray of image-bearing light WG downward at an angle relative to the direction of travel of the image-bearing light WG in the area of the turn. The diffractive features of the first zone 214 are also operable to out-couple the turned image-bearing light WG as image-bearing light WO. As illustrated in FIGS. 6A and 6B, the diffractive features of the first zone 214 define two grating vectors k1, k2 that combine with the grating vector k0 of the in-coupling diffractive optic 210 to form a vector diagram describing a closed triangle and having substantially zero magnitude. In other words, a combination of grating vectors k0, k1, k2 forms a vector having substantially no magnitude. In an embodiment, the grating vectors k0, k1, k2 form a closed isosceles triangle. In another embodiment, grating vectors k0, k1, k2 form a closed scalene triangle. In this way, there would be no dispersion or angular error induced in the virtual image by the diffractive features of the first zone 214. The first zone 214 also implicitly defines a fourth grating vector k3, via the arrangement of the diffractive features thereof, that is equivalent to the grating vector k0 of the in-coupling diffractive optic 210. In this embodiment, these grating vectors k0, k1, k2, k3 are all necessary in the first diffraction zone 214.

As illustrated in FIGS. 7A-7C, where a ray of image-bearing light WG corresponds to a portion of a virtual image that is further down and to the right of center of the virtual image, the projection of the eyebox 232C is correspondingly moved. Where this ray of image-bearing light WG propagates through the waveguide 202 to an area in the third zone 218, but the ray of image-bearing light WG needs to exit from a portion of the out-coupling diffractive optic 212 in the fourth or fifth zones 220, 222, the third zone 218 is operable to redirect (i.e., turn) the image-bearing light WG downward in the y-axis direction toward the fifth zone 222. Any image-bearing light WG that is directly out-coupled from the third zone 218, i.e., as from a linear diffraction grating, would miss the viewer's eye. In order for the third and fifth zones 218, 222 to redirect or out-couple the image-bearing light WG, only one grating vector is required.

Propagation symmetry dictates that sometimes image-bearing light WG will travel downward in the y-axis direction toward the fifth zone 222 and need to turn upward in the y-axis direction towards the third zone 218 to be out-coupled as image-bearing light WO. The grating features required to redirect image-bearing light WG toward the third zone 218 are identical to the grating features required to out-couple image-bearing light WG redirected from the third zone 218. Therefore, only a single grating vector k5 is necessary in the fifth zone 222.

The second and fourth zones 216, 220 are operable as transition, or intermediate, zones of the out-coupling diffractive optic 212, where the design of the grating features in the second and fourth zones 216, 220 is some combination, or convolution, of the two neighboring zones. For example, the second zone 216 describes a combination of the first and third zones 214, 218. The transition zones 216, 220 make for smoother transitions in the waveguide 202 and produce a more desirable see-through experience of the image light guide 200; for example, a more uniform illumination of the resulting virtual image across the field of view (FOV). In an embodiment, the out-coupling diffractive optic 212 includes multiple transition zones from the center of the out-coupling diffractive optic 212 to the edges thereof in the x- and y-axis directions.

As illustrated in FIGS. 8A-8C, in an embodiment, the depth of the diffractive features in the two or more zones 214, 215, 216, 217, 218, 219, 220, 221, 222, 223, 224, 225, 226, 227, 229 of the out-coupling diffractive optic 212 can vary independently of the zone boundaries 290 (see FIG. 10) which are defined in the underlying configuration of the diffractive features. The underlying configuration of the diffractive features of the out-coupling diffractive optic 212 determines the direction and relative magnitude of diffracted orders, whereas depth modulation of the diffractive features serves to modulate the relative efficiency of all the present diffracted orders. It is possible to apply a gradient depth that is independent of the underlying pattern of the diffractive features of the out-coupling diffractive optic 212.

In an embodiment, the depth of the diffractive features in zones 214, 215, 216, 217, 218, 219, 220, 221, 222, 223, 224, 225, 226, 227, 229 is progressively increased as the diffractive features approach the edge of the out-coupling diffractive optic in the y-axis direction. For example, as illustrated in FIG. 8D, the diffractive features 250 (see FIG. 9) may range progressively in depth $n_1$-$n_3$ from a centerline 280 of the first zone 214 to the outer edge of the first zone 214 in the y-axis direction, the diffractive features 256 (see FIG. 9) may range progressively in depth $n_4$-$n_6$ from the edge of the first zone 214 to the outer edge of the second zone 216 in the y-axis direction, and the diffractive features 252 (see FIG. 9) may range progressively in depth $n_7$-$n_9$ from the edge of the second zone 216 to the outer edge of the third zone 218 in the y-axis direction. This progressive increase in depth of the diffractive features is mirrored across the centerline 280 of the first zone 214. FIG. 8A shows a schematic of a linear grating feature which increases in depth along a y-axis symmetrically across a center-plane 282 parallel with the x-z plane. FIG. 8B shows a schematic of a linear grating feature which increases in depth in a stepped configuration along the y-axis symmetrically across the center-plane 282 parallel with the x-z plane.

In another embodiment, the depth of the diffractive features in zones 214, 215, 216, 217, 218, 219, 220, 221, 222, 223, 224, 225, 226, 227, 229 is progressively increased as the diffractive features approach the edge of the out-coupling diffractive optic in the x-axis direction. FIG. 8C shows a schematic of a linear grating feature which increases in depth along an x-axis symmetrically across a center-plane 284 parallel with the y-z plane. In an embodiment, the depth of the diffractive features in zones 214, 215, 216, 217, 218, 219, 220, 221, 222, 223, 224, 225, 226, 227, 229 is progressively increased as the diffractive features approach the edge of the out-coupling diffractive optic in both the x- and y-axis directions.

Figure 9:
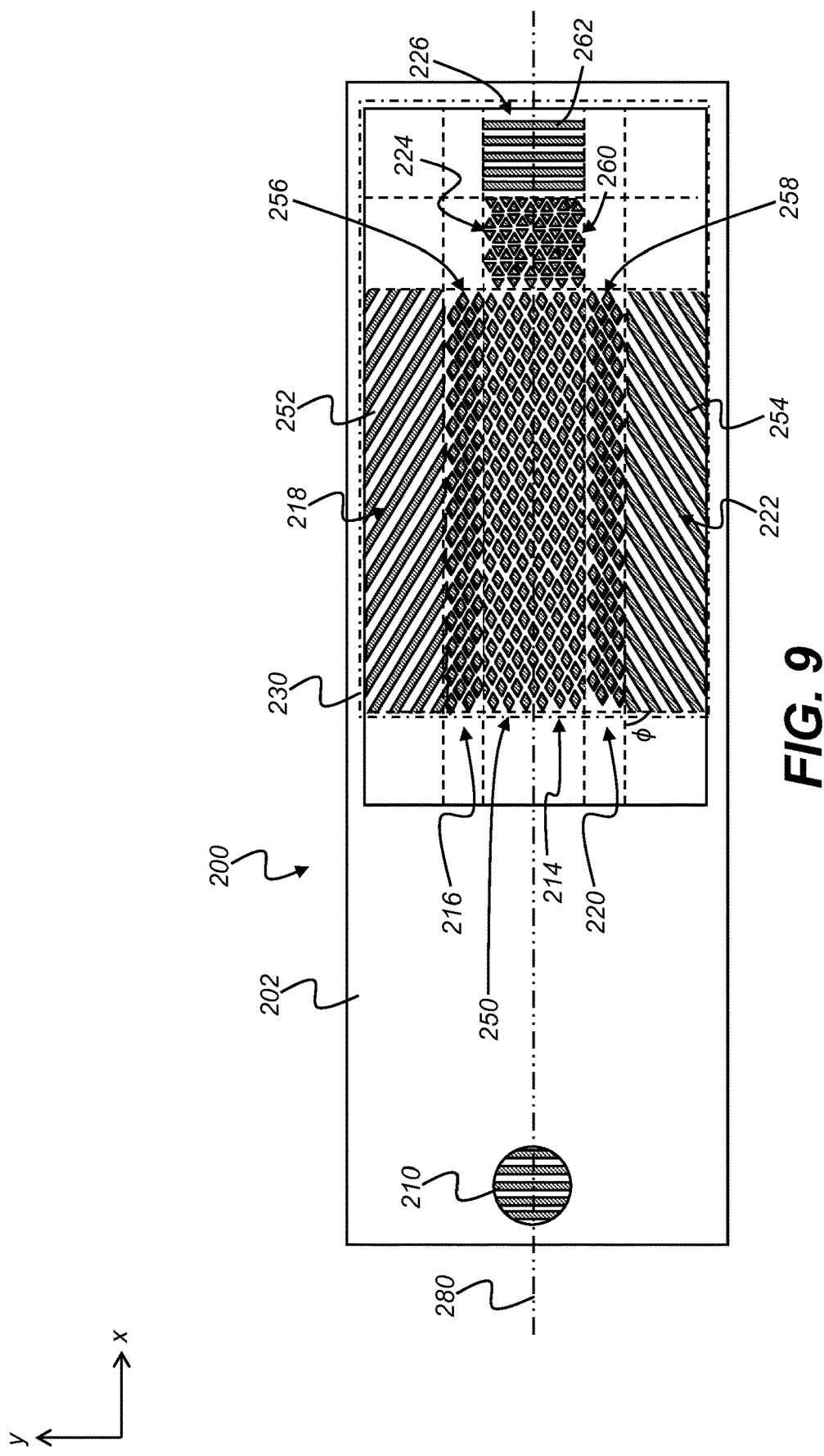
FIG. 9 is a top view of an image light guide having a zoned out-coupling diffractive optic according to an exemplary embodiment of the presently disclosed subject matter.
Figure 11C:
FIGS. 11A, 11B, 11C, 11D, 11E are schematic diagrams of diffractive features according to an exemplary embodiment of the presently disclosed subject matter.
Figure 11E:
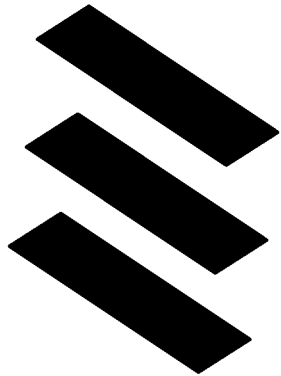
Figure 11B:
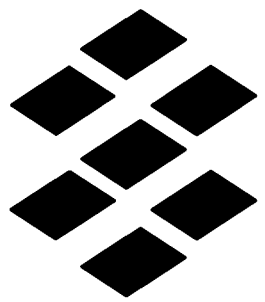
Figure 11D:
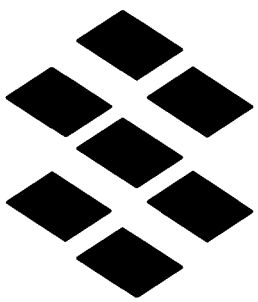
Figure 11A:
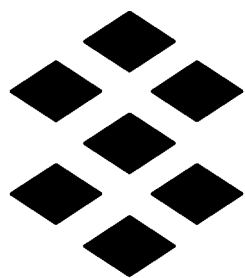

As illustrated in FIG. 9, in an embodiment, the first zone 214 of the out-coupling diffractive optic 212 includes diffractive features 250 describing a compound diffractive pattern. The diffractive features 250 as illustrated in FIG. 9 are generally diamond-shaped posts. A schematic of the diffractive features 250 is shown in FIG. 11A. In another embodiment, the diffractive features 250 are one or more sinusoidal rows or wavy features. The diffractive feature 252, 254 of the third and fifth zones 218, 222, respectively, describe linear gratings. The diffractive features 254 are symmetric with the diffractive features 252 about the centerline 280 of the first zone 214. The diffractive features 252, 254 are also disposed at an angle #relative to the centerline 280. A schematic of the diffractive features 252 is shown in FIG. 11C, and a schematic of the diffractive features 254 is shown in FIG. 11E.

The diffractive features 256 of the second zone 216 describe a combination of the diffractive features 250 and the diffractive features 252. In other words, in an embodiment, the diffractive features 256 are parallelogram-shaped features. A schematic of the diffractive features 256 is shown in FIG. 11B. Similarly, the diffractive features 258 of the fourth zone 220 describe a combination of the diffractive feature 250 and the diffractive features 254 such that the diamond-shaped features approach linear gratings. In other words, in an embodiment, the diffractive features 258 are parallelogram-shaped features. A schematic of the diffractive features 258 is shown in FIG. 11D. The diffractive features 260 of the sixth zone 224 describe generally triangular-shaped features approaching generally linear gratings disposed generally parallel with the y-axis. The diffractive features 262 of the seventh zone 226 describe generally vertical linear gratings located generally parallel with the y-axis.

Figures 12, 13:
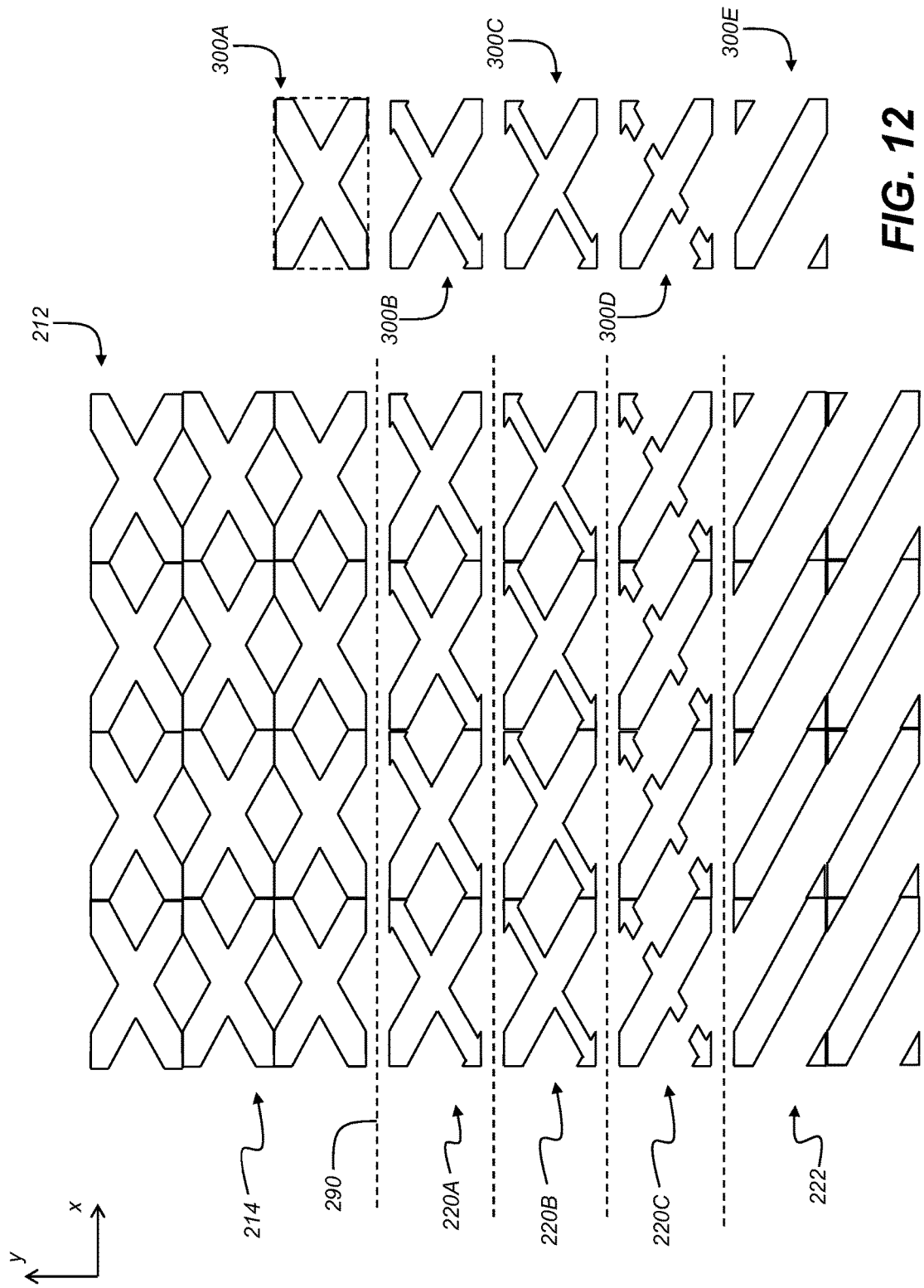
FIG. 12 shows schematics of rectangular unit cells operable to form repeating patterns of diffractive features within an out-coupling diffractive optic according to an exemplary embodiment of the presently disclosed subject matter.
FIG. 13 shows a schematic of a portion of an out-coupling diffractive optic comprising unit cells according to FIG. 12.

FIG. 12 shows a schematic of rectangular unit cells 300A, 300B, 300C, 300D, 300E. In an embodiment, the first zone 214, the fourth zone 220A, 220B, 220C, and the fifth zone 222 of the out-coupling diffractive optic 212 are formed by the arrangement of the unit cells 300A, 300B, 300C, 300D, 300E located in a two-dimensional lattice. In an embodiment, each unit cell 300A, 300B, 300C, 300D, 300E comprises the smallest repeating diffractive feature within a zone. However, unit cell 300A, 300B, 300C, 300D, 300E may be any size such that the unit cell is repeatable within the zone to form the periodic diffractive features thereof. The diffractive features within each zone comprise an arrangement of the unit cells in a periodic grid, forming the two-dimensional periodic lattice structure. The periodic grid is the same for each zone 214, 215, 216, 217, 218, 219, 220, 221, 222, 223, 224, 225, 226, 227, 229 within the out-coupling diffractive optic 212. As shown in FIG. 13, a portion of the compound diffractive pattern of the out-coupling diffractive optic 212 comprises the replication and contiguous arrangement of the unit cells 300A, 300B, 300C, 300D, 300E. Persons skilled in the art will recognize that there may be more unit cells 300A, 300B, 300C, 300D, 300E in the x- and/or y-axis directions of each of the first zone 214, the fourth zone 220A, 220B, 220C, and the fifth zone 222.

In an embodiment, there are multiple zones transitioning from the center of the out-coupling diffractive optic 212 to its edges in the y- and/or x-axis directions. In reality only a finite number of nanostructures are permitted in the y- and/or x-axis directions of the out-coupling diffractive optic 212. Therefore, in an embodiment, the number of transition zones from the center of the out-coupling diffractive optic 212 to its edges in the y- and/or x-axis directions is, at least in part, a function of the smallest producible structure and the size of the out-coupling diffractive optic 212.

Figure 10:
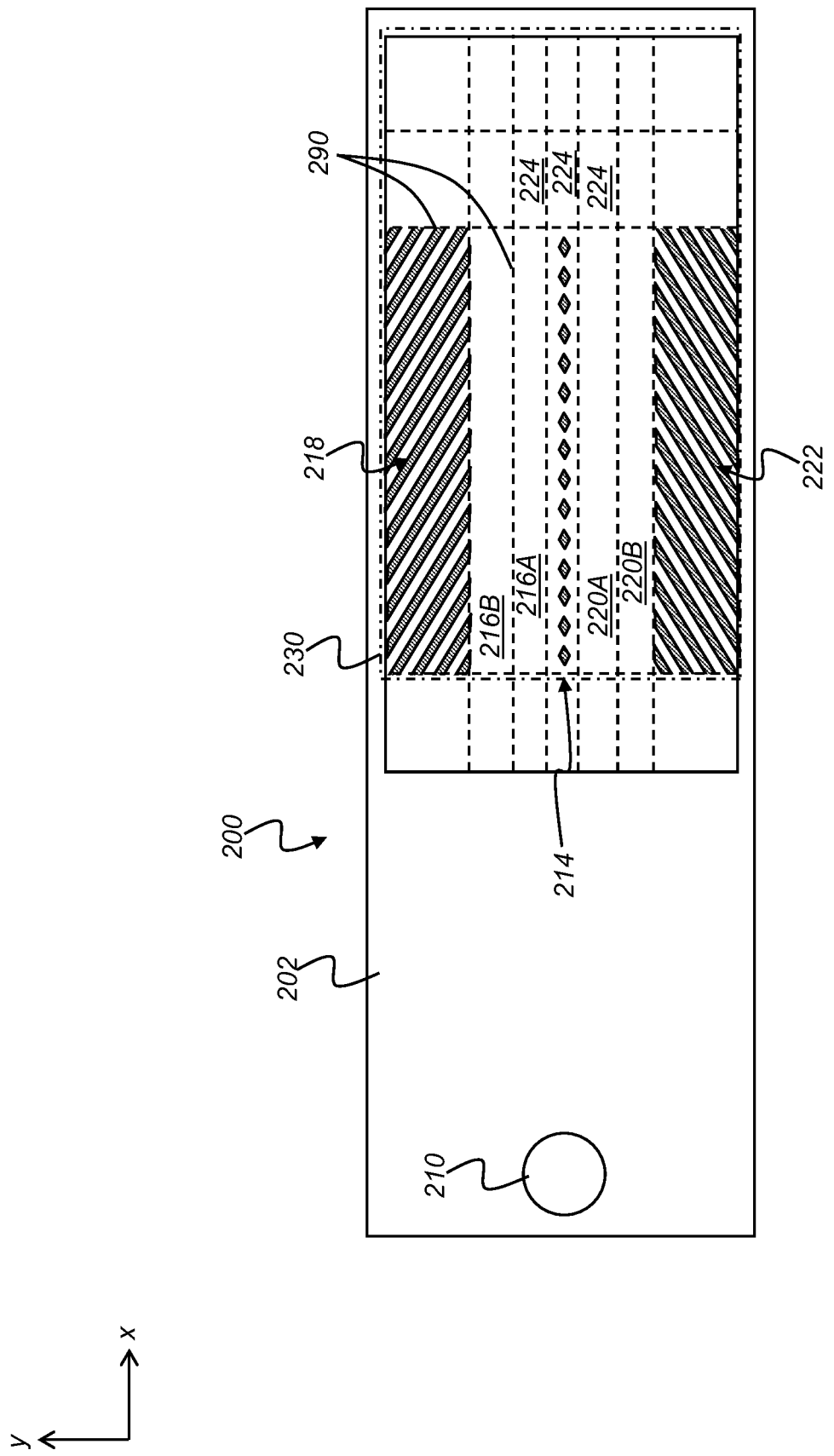
FIG. 10 is a top view of an image light guide having a zoned out-coupling diffractive optic according to an exemplary embodiment of the presently disclosed subject matter.

In another embodiment, the zones 214, 215, 216, 217, 218, 219, 220, 221, 222, 223, 224, 225, 226, 227, 229 of the out-coupling diffractive optic 212 are delineated by gap areas. As illustrated in FIG. 10, the zone boundaries 290 are indicated by dotted lines defining the zones 214, 215, 216, 217, 218, 219, 220, 221, 222, 223, 224, 225, 226, 227, 229.

The zone boundaries 290 may define gap areas between the zones 214, 215, 216, 217, 218, 219, 220, 221, 222, 223, 224, 225, 226, 227, 229.

As illustrated in FIG. 10, in an embodiment, the diffractive features 250 of the first zone 214 may comprise only a single row. In this embodiment, the second zone 216 includes subsections 216A, 216B where the diffractive features 256 in zone 216B are closer to linear gratings than the diffractive features 256 in zone 216A. The fourth zone 220 includes subsections 220A, 220B, where the diffractive features 258 in zone 220B are closer to linear gratings than the diffractive features 258 in zone 220A.

Figure 14A:
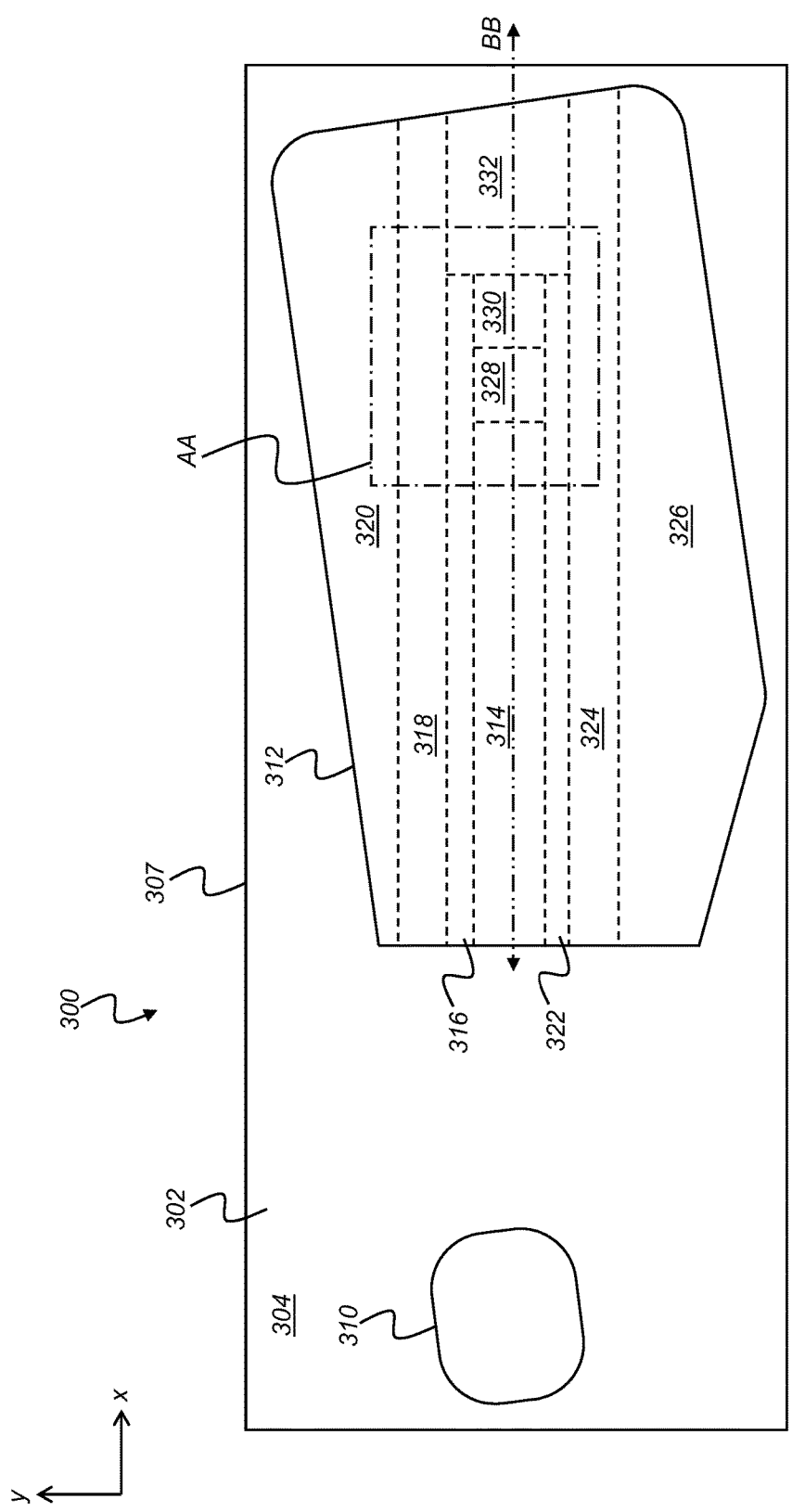
FIGS. 14A and 14B show a schematic top and side view, respectively, of an image light guide having a zoned out-coupling diffractive optic according to an exemplary embodiment of the presently disclosed subject matter.
Figure 14B:
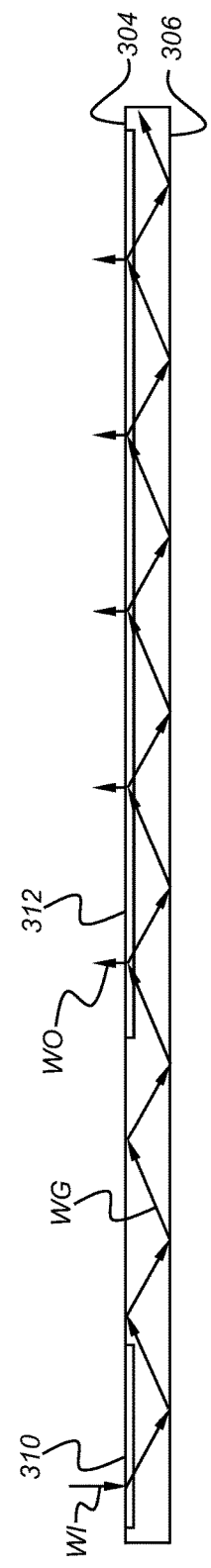

As illustrated in FIGS. 14A and 14B, in an embodiment, an image light guide 300 includes a waveguide 302 having front and back parallel surfaces 304, 306. An in-coupling diffractive optic 310 and an out-coupling diffractive optic 312 are located on the waveguide front surface 304. The out-coupling diffractive optic 312 comprises a compound diffraction grating pattern operable to expand and out-couple image-bearing light WG as image-bearing light WO. The out-coupling diffractive optic 312 includes ten zones 314, 316, 318, 320, 322, 324, 326, 328, 330, 332 of diffractive features, wherein the diffractive features of each zone 314, 316, 318, 320, 322, 324, 326, 328, 330, 332 are different from the diffractive features in an adjacent zone 314, 316, 318, 320, 322, 324, 326, 328, 330, 332.

Figure 15:
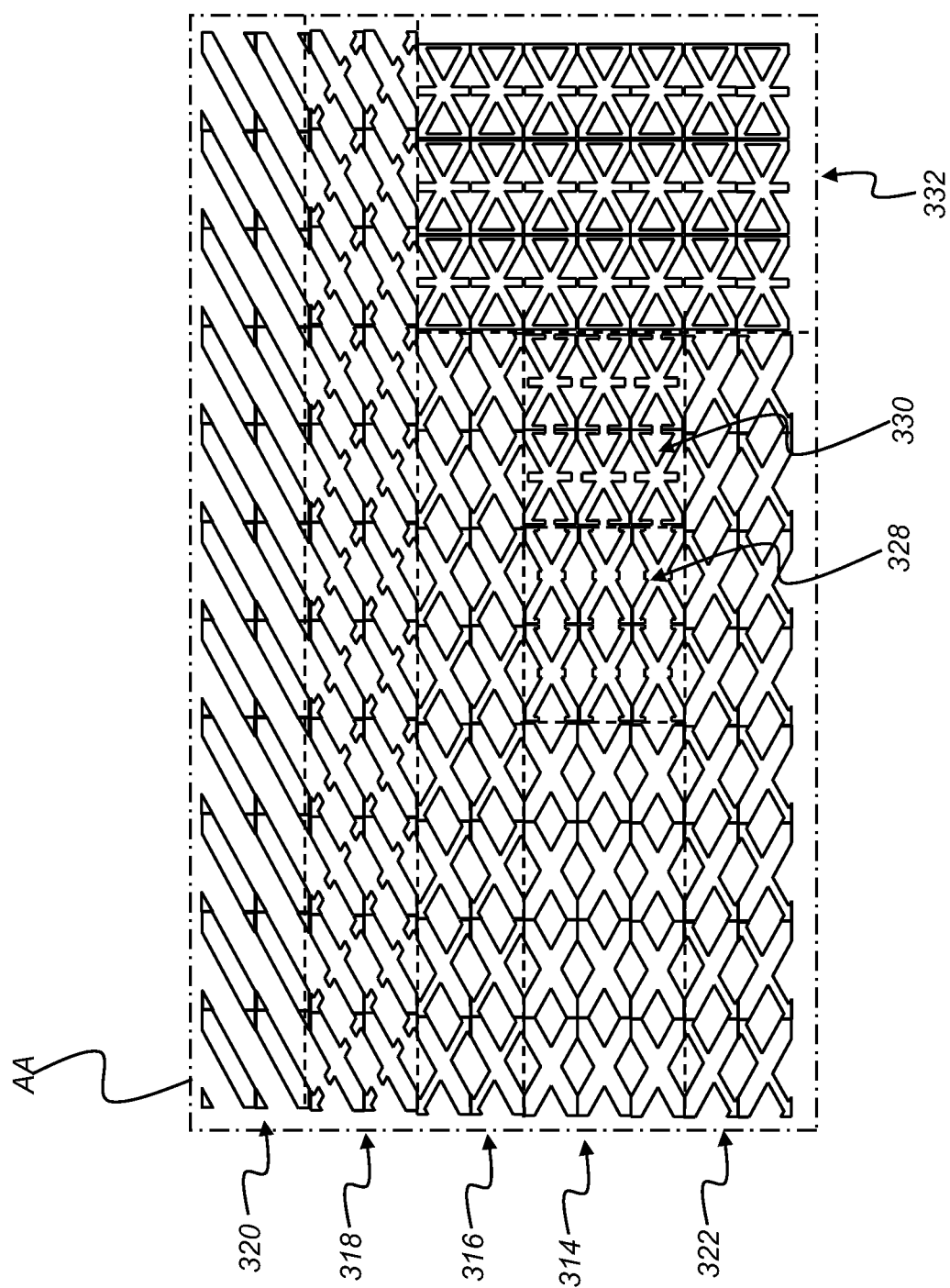
FIG. 15 shows a schematic of a portion of an out-coupling diffractive optic according to FIG. 14.

The out-coupling diffractive optic first zone 314 is generally centrally located in the y-axis direction. A second zone 316 is generally located above and adjacent to the first zone 314 in the y-axis direction. A third zone 318 is generally located above and adjacent to the second zone 316. A fourth zone 320 is generally located above and adjacent to the third zone 318. The second zone 316 and the third zone 318 comprise diffractive optics operable as transition zones between the diffractive features of the first zone 314 and the fourth zone 320. In other words, the second and third zones 316, 318 comprise diffractive features which are a combination, or convolution, of the first zone 314 and the fourth zone 310. As illustrated in FIG. 15, the second zone 316 more closely resembles the first zone 314 and the third zone 318 more closely resembles the fourth zone 320.

A fifth zone 322 is generally located below and adjacent to the first zone 314 in the y-axis direction. A sixth zone 324 is generally located below and adjacent to the fifth zone 322 in the y-axis direction. A seventh zone 326 is generally located below and adjacent to the sixth zone 324 in the y-axis direction. The fifth and sixth zones 322, 324 comprise diffractive optics operable as transition zones between the diffractive features of the first zone 314 and the seventh zone 326. In other words, the fifth and sixth zones 322, 324 comprise diffractive features which are a combination, or convolution, of the first zone 314 and the seventh zone 326. The diffractive features of the fifth, sixth, and seventh zones 322, 324, 326 are symmetric with the diffractive features of the second, third, and fourth zones 316, 318, 320 across a centerline of the first zone 314. However, the shape of the out-coupling diffractive optic 312 is not necessarily symmetric across the centerline of the first zone 314.

An eighth zone 328 is generally centrally located in the y-axis direction and generally located adjacent to the right of the first zone 314 in the x-axis direction. A ninth zone 330 is generally centrally located in the y-axis direction and generally located adjacent to the right of the eighth zone 328 along the x-axis direction. A tenth zone 332 is also generally centrally located in the y-axis direction between the third zone 318 and the sixth zone 324, and generally located adjacent to the right of the ninth zone 330, the second zone 316, and the fifth zone 322 along the x-axis direction. The eighth and ninth zones 328, 330 comprise diffractive features operable as transition zones between the diffractive features of the first zone 314 and the tenth zone 332. In other words, the eighth and ninth zones 328, 330 comprise diffractive features which are a combination, or convolution, of the first zone 314 and the tenth zone 332.

In addition, the first zone 314, the eighth zone 326, and the ninth zone 330 have generally the same width in the y-axis direction. The first zone 314, the second zone 316, and the fifth zone 322 combined have generally the same width in the y-axis direction as the tenth zone 332. In an embodiment, the length of the fourth zone 320, the third zone 318, the sixth zone 324 and the seventh zone 326 in the y-axis direction is not equal.

Figure 16:
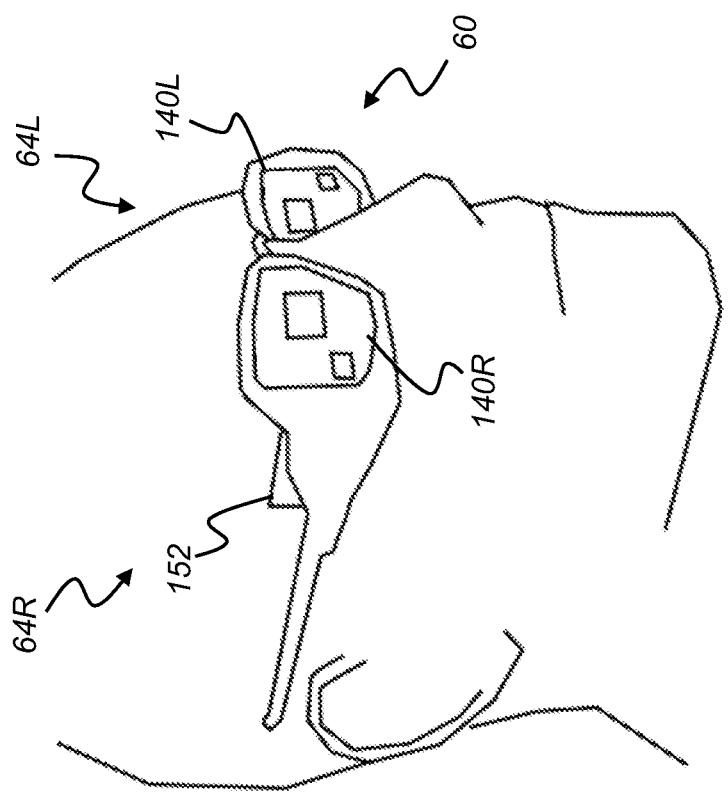
FIG. 16 is a perspective view of a binocular display system for augmented reality viewing using at least one near-focus image light guide according to an exemplary embodiment of the presently disclosed subject matter.

The perspective view of FIG. 16 shows a display system 60 for three-dimensional (3-D) augmented reality viewing using a pair of image light guides of the present disclosure. Display system 60 is shown as an HMD with a left-eye optical system 64L having an image light guide 140L for the left eye and a corresponding right-eye optical system 64R having an image light guide 140R for the right eye. An image source 152, such as a picoprojector or similar device, can be provided, energizable to generate a separate image for each eye, formed as a virtual image with the needed image orientation for upright image display. The images that are generated can be a stereoscopic pair of images for 3-D viewing. The virtual image that is formed by the optical system can appear to be superimposed or overlaid onto the real-world scene content seen by the viewer through an image light guide. Additional components familiar to those skilled in the augmented reality visualization arts, such as one or more cameras mounted on the frame of the HMD for viewing scene content or viewer gaze tracking, can also be provided. Alternate arrangements are possible, including a display apparatus for providing an image to one eye.

Image Light Guide Fabrication

In-coupling and out-coupling diffractive optics IDO and ODO can be diffraction gratings or formed as volume holograms, or formed from a holographic polymer dispersed liquid crystal, for example. The waveguide substrate S of the image light guide is typically glass or other optical material with sufficient index of refraction for supporting TIR transmission between an in-coupling diffractive optic and an out-coupling diffractive optic.

In-coupling diffractive optics IDO and out-coupling diffractive optics ODO can have different grating periods appropriate to their functions. After proper surface preparation of a glass substrate blank, the diffraction components can be formed on one or both outer surfaces of the pupil expander using nano-imprinting methods, for example. At least one of the in-couplings and out-couplings can be a surface relief diffraction grating.

In practice, it can be difficult to measure successive changes that define each zone of the out-coupling diffractive optic, particularly where high resolution is provided. Boundary portions of the out-coupling diffractive optic can be compared to indicate changes in the respective grating patterns.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. An image light guide for conveying a virtual image, comprising:
a waveguide;
an in-coupling diffractive optic configured to direct image-bearing light beams into said waveguide; and
an out-coupling diffractive optic configured to expand an eyebox in two dimensions and direct at least a portion of said image-bearing light beams from said waveguide toward said eyebox;
wherein said out-coupling diffractive optic comprises a first zone comprising a first set of diffractive features, and a second zone comprising a second set of diffractive features arranged adjacent to said first zone along at least one dimension;
wherein said first set of diffractive features define at least a first grating vector and a second grating vector, and said second set of diffractive features define at least a third grating vector and a fourth grating vector,
wherein said first and third grating vectors are substantially parallel and said second and fourth grating vectors are substantially parallel;
wherein a magnitude of a first diffracted order of said image-bearing light output by said second set of diffractive features defined by said third grating vector is less than a magnitude of the first diffracted order of said image-bearing light output by said first set of diffractive features defined by said first grating vector.

2. The image light guide according to claim 1, wherein said in-coupling diffractive optic defines an in-coupling grating vector, and wherein a combination of said in-coupling grating vector, said first grating vector, and said second grating vector produce a triangular vector diagram having zero magnitude.

3. The image light guide according to claim 1, wherein said first zone is centrally located in the out-coupling diffractive optic along said at least one dimension.

4. The image light guide according to claim 3, wherein a third zone is disposed arranged opposite said second zone across said first zone.

5. The image light guide according to claim 4, wherein said out-coupling diffractive optic further comprises one or more transition zones between said two or more zones, wherein said transition zones comprise diffractive features which are a function of a combination of diffractive features of said neighboring two or more zones.

6. The image light guide according to claim 4, wherein a depth of said set of diffractive features in said two or more zones increases along said first dimension.

7. The image light guide according to claim 4, further comprising:
a fourth zone located along said at least one dimension, wherein said second zone is arranged between said first zone and said fourth zone along said at least one dimension, wherein said fourth zone comprises linear diffractive features defining a grating vector substantially parallel with said second grating vector, and
a fifth zone located along said at least one dimension, wherein said third zone is located between said first zone and said fifth zone along said at least one dimension, and wherein said fifth zone comprises linear diffractive features defining a grating vector substantially parallel with said first grating vector.

8. The image light guide according to claim 1, wherein a depth of said first and second set of diffractive features varies independently of a boundary of said first and second zones.

9. The image light guide according to claim 1, wherein at least one of said first and second zones is located on an opposing surface of said waveguide.

10. The image light guide according to claim 1, wherein said first and second zones are separated along a first dimension.

11. An image light guide for conveying a virtual image, comprising:
a waveguide;
an in-coupling diffractive optic operable to direct image-bearing light beams into said waveguide; and
an out-coupling diffractive optic operable to direct said image-bearing light beams from said waveguide toward an eyebox;
wherein said out-coupling diffractive optic comprises two or more zones each comprising a set of diffractive features;
wherein each said set of diffractive features within each two or more zones comprises a plurality of unit cells arranged in a two-dimensional periodic lattice;
wherein said two-dimensional periodic lattice is the same for each two or more zones within said out-coupling diffractive optic; and
wherein said unit cells between at least two adjacent zones define diffractive features comprising a different shape.

12. The image light guide according to claim 11, wherein each said unit cell is symmetric along an axis.

13. The image light guide according to claim 11, wherein said difference in said diffractive features in said adjacent zones comprise a different depth of said diffractive features.

14. The image light guide according to claim 11, wherein at least one of said two or more zones comprises a compound diffractive pattern.

15. The image light guide according to claim 14, wherein at least one of said two or more zones comprises rectangular or diamond features.

16. An image light guide for conveying a virtual image, comprising:
a waveguide;
an in-coupling diffractive optic configured to direct image-bearing light beams into said waveguide; and
an out-coupling diffractive optic configured to expand an eyebox in two dimensions and direct at least a portion of said image-bearing light beams from said waveguide toward said eyebox;
wherein said out-coupling diffractive optic comprises an array of zones arranged along a first dimension and a second dimension, wherein each zone comprises a set of diffractive features;
wherein successive zones along said first dimension of said out-coupling diffractive optic have respective sets of diffractive features with a different shape, and
wherein said successive zones along said first dimension output a variable magnitude of a first diffracted order of said image-bearing light.

17. The image light guide according to claim 16, wherein one or more zones comprise diffractive features having a shape that is a function of a combination of diffractive features of two or more adjacent zones along said first dimension.

18. The image light guide according to claim 16, wherein a depth of said set of diffractive features in said array of zones is variable along said first dimension.

19. The image light guide according to claim 16, wherein said array of zones is symmetric in said first dimension across an axis.

* * * * *